United States Patent [19]

Van Slyke

[11] Patent Number: 5,333,698

[45] Date of Patent: Aug. 2, 1994

[54] WHITE MINERAL OIL-BASED DRILLING FLUID

[75] Inventor: Donald C. Van Slyke, Brea, Calif.

[73] Assignee: Union Oil Company of California, Los Angeles, Calif.

[21] Appl. No.: 65,644

[22] Filed: May 21, 1993

[51] Int. Cl.$^5$ .............................................. E21B 43/00
[52] U.S. Cl. ....................................................... 175/65
[58] Field of Search ........................ 175/65, 66, 69, 70

[56] References Cited

U.S. PATENT DOCUMENTS

| | | | |
|---|---|---|---|
| 3,878,117 | 4/1975 | Williams et al. | 252/47 |
| 3,912,683 | 10/1975 | O'Farrell . | |
| 3,954,627 | 5/1976 | Dreher et al. | 175/65 X |
| 4,007,149 | 2/1977 | Burton et al. . | |
| 4,012,329 | 3/1977 | Hayes et al. | 175/65 X |
| 4,148,821 | 4/1979 | Nussbaum et al. | 260/505 S |
| 4,153,588 | 5/1979 | Makowski et al. . | |
| 4,390,474 | 6/1983 | Nussbaum et al. | 260/505 R |
| 4,425,462 | 1/1984 | Turner et al. . | |
| 4,447,338 | 5/1984 | Lundberg et al. . | |
| 4,488,975 | 12/1984 | Almond . | |
| 4,552,215 | 11/1985 | Almond et al. . | |
| 4,553,601 | 11/1985 | Almond et al. . | |
| 4,671,883 | 6/1987 | Connell et al. | 175/65 X |
| 4,787,990 | 11/1988 | Boyd . | |
| 4,810,355 | 3/1989 | Hopkins | 208/58 |
| 5,096,883 | 3/1992 | Mercer et al. . | |
| 5,189,012 | 2/1993 | Patel et al. . | |

FOREIGN PATENT DOCUMENTS 8302949 9/1983 PCT Int'l Appl. .
2212192 7/1989 United Kingdom .

OTHER PUBLICATIONS

Watson et al., *Journal of Industrial and Engineering Chemistry*, 27: 1460 et seq. (Dec. 1935).

IADC/spe 11355.

V. Biske et al., *Proceedings Fourth World Petroleum Congress–Section III/A*, pp. 1–17.

Fiero, G. W., "Purity of White Mineral Oil," vol. 23, pp. 226–231 (May, 1965).

Primary Examiner—Thuy M. Bui
Attorney, Agent, or Firm—Gregory F. Wirzbicki; Shlomo R. Frieman

[57] ABSTRACT

A wellbore fluid (e.g., a drilling, completion, packer, or fracturing fluid) comprises (a) at least one additive selected from the group consisting of emulsifiers, wetting agents, viscosifiers, weighting agents, fluid loss control agents, proppants for use in hydraulically fracturing subterranean formations, and particulate agents for use in forming a gravel pack; and (b) a non-toxic white mineral oil having (i) an API gravity at 15.6° C. (60° F.) greater than 35, (ii) a content of compounds containing 14 or more carbon atoms of at least about 95 weight percent, and (iii) a pour point of at least about −30° C. (−22° F.).

100 Claims, No Drawings

WHITE MINERAL OIL-BASED DRILLING FLUID

BACKGROUND

The present invention relates to oil-based wellbore fluids (e.g., oil-based drilling fluids) and systems and processes for using them in a subterranean formation in oil and gas recovery operations.

Oil-based drilling fluids and techniques for drilling boreholes in subterranean formations to recover hydrocarbons (e.g., oil and gas) are well known to those skilled in the art. In addition, a number of less toxic oil-based drilling fluids have been proposed as evidenced by, for example, U.S. Pat. Nos. 4,787,990, 5,096,883, 5,189,012, International Publication WO 83/02949, and IADC/SPE 11355. While a number of commercially available, low toxicity base oils are inexpensive, they have not acquired FDA approval for direct use in food. On the other hand, the dimer of 1-decene has obtained such FDA approval, but its prohibitive expense significantly restricts its use in drilling operations.

SUMMARY OF THE INVENTION

Accordingly, there is a need for an oil-based drilling fluid that employs an inexpensive, readily available, FDA approved, non-toxic base oil. The present invention satisfies this need by providing a drilling fluid comprising (a) at least one drilling fluid additive (e.g., an emulsifier, a viscosifier, a weighting agent, and an oil-wetting agent) and (b) a white mineral oil having (i) an API gravity at 15.6° C. (60° F.) greater than 35, (ii) a content of compounds containing 14 or more carbon atoms of at least about 95 weight percent, and (iii) a pour point of at least about $-30°$ C. ($-22°$ F.).

In addition, a drilling system and a method for drilling a borehole are also provided by the invention. The drilling system comprises (a) at least one subterranean formation, (b) a borehole penetrating a portion of at least one of the subterranean formations, (c) a drill bit suspended in the borehole, and (d) the above drilling fluid located in the borehole and proximate the drill bit.

Regarding the method for drilling a borehole of the present invention, this method comprises the steps of (a) rotating a drill bit at the bottom of the borehole and (b) introducing the aforesaid drilling fluid into the borehole (i) to pick up drill cuttings and (ii) to carry at least a portion of the drill cuttings out of the borehole.

DETAILED DESCRIPTION OF THE INVENTION

The white mineral oil employed as the base oil in the drilling fluid of the present invention commonly has a characterization factor greater than 12, more commonly at least about 12.1, even more commonly at least about 12.2, and most commonly at least about 12.3. Generally, the characterization factor of the white mineral oil is less than about 13, more typically less than about 12.9, even more typically less than about 12.8, and most typically less than about 12.7. (As used in the specification and claims, the characterization factor is determined in accordance with the procedure set forth in Watson et al., *Journal of Industrial and Engineering Chemistry*, 27(12):1460 et seq. (December, 1935; this publication being incorporated herein in its entirety by reference), with the average boiling point being the 50 percent temperature in the Engler distillation.)

Regarding API gravity, the white mineral oil often has an API gravity at about 15.6° C. (60° F.) (as measured by ASTM D 1298) of at least about 35.25, more often at least about 35.5, even more often at least about 35.75, and most often at least about 36. Frequently, the white mineral oil has an API gravity at about 15.6° C. (60° F.) of less than about 50, more frequently less than about 45, even more frequently less than about 44.75, and most frequently less than about 44.5.

The n-paraffinic content of the white mineral oil (as determined by the procedure set forth in Attachment A) is usually greater than about 5.25, more typically greater than about 5.5, even more commonly greater than about 5.75, and most frequently greater than about 6, weight percent. In some white mineral oils, the n-paraffinic content is even greater than about 10, about 15, or even about 20 weight percent.

The white mineral oil commonly has a total paraffinic content (as determined by UTM 407-90) of at least about 25, more commonly at least about 30, even more commonly at least about 33, and most commonly at least about 35, weight percent. Typically, the total paraffinic content of the white mineral oil is less than about 70, more typically less than about 65, even more typically less than about 60, and most typically less than about 58, weight percent.

Concerning naphthenic content, the mononaphthenic content of the white mineral oil (as determined by UTM 407-90) is frequently about 20 to about 50, more frequently about 25 to about 45, even more frequently about 27 to about 44, and most frequently about 29 to about 43, weight percent. The white mineral oil often has a polynaphthenic content (as determined by UTM 407-90) of about 5 to about 30, more often about 10 to about 25, even more often about 12 to about 23, and most often about 13 to about 22, weight percent. The total naphthenic content of the white mineral oil (as determined by UTM 407-90) is typically about 30 to about 75, more typically about 35 to about 70, even more typically about 40 to about 67, and most typically about 42 to about 65, weight percent.

With respect to the carbon content of the compounds contained in the white mineral oil, the concentration of compounds containing 14 or more carbon atoms (as determined by ASTM D 2887) is generally at least about 95, more typically at least about 96, even more commonly at least about 97, and most frequently at least about 98, weight percent. Compounds comprising 18 or more carbon atoms typically make up (as determined by ASTM D 2887) at least about 10, more typically at least about 15, even more typically at least about 20, and most typically at least about 24, weight percent of the white mineral oil. In fact, it is not uncommon for compounds containing 18 or more carbon atoms to constitute at least about 70, 75, 80, or even about 85, weight percent of the white mineral oil.

In addition, the white mineral oil comprises up to about 30 weight percent compounds containing 15 or less carbon atoms (as determined by ASTM D 2887). Often the white mineral oil comprises at least about 0.1, more often at least about 0.5, even more often at least about 1, and most often at least about 1.5, weight percent compounds containing 15 or less carbon atoms. Generally, compounds containing 15 or less carbon atoms account for less than about 27, more commonly less than about 25, and even more typically less than about 23, weight percent of the white mineral oil. In fact, the concentration of compounds containing 15 or less carbon atoms in the white mineral oil can be less than about 15, 10, or even 5 weight percent.

The white mineral oils employed in the present invention preferably have an aromatic content (as determined by ASTM D 2887) of less than about 0.5, more preferably less than about 0.4, even more preferably less than about 0.3, and most preferably less than about 0.2, weight percent.

The pour point of the white mineral oils used in the invention (as determined by ASTM D 97) is generally greater than about $-30°$ C. ($-22°$ F.), more commonly greater than about $-25°$ C. ($-13°$ F.), even more commonly greater than about $-20°$ C. ($-4°$ F.), and most commonly greater than about $-15°$ C. ($5°$ F.). Usually, the pour point of the white mineral oil is less than about $0°$ C. ($32°$ F.).

The flash point of the white mineral oil (as determined by ASTM D 92) is normally greater than about $121.1°$ C. ($250°$ F.).

The viscosity of the white mineral oil at $40°$ C. ($104°$ F.) (as measured by ASTM D 445) is ordinarily between about 1 to about 10 centistokes (cst). In one embodiment of the invention, the white mineral oil generally has a viscosity at $40°$ C. ($104°$ F.) of about 2 to about 6, and more typically about 3 to about 5, cst. In another embodiment of the invention, the white mineral oil has a viscosity at $40°$ C. ($104°$ F.) greater than 6 cst. In this version of the invention, the white mineral oil frequently has a viscosity at $40°$ C. ($104°$ F.) of about 6.1 to about 9.5, more often about 6.2 to about 9.25, even more often about 6.3 to about 9, and most often about 6.4 to about 8.75, cst.

The properties of several exemplary white oils within the scope of the present invention are listed in the following Table I.

TABLE I

Exemplary White Oil Properties

| Property | Drakeol 5[a] | Draketex 50[b] | Peneteck[c] |
|---|---|---|---|
| Viscosity | | | |
| SUS @ 37.8° C. (100° F.)[d] | 52/57 | 48/53 | 38/42 |
| CST @ 40° C. (104° F.)[e] | 7.6/8.7 | 6.5/7.8 | 3.4/4.7 |
| API @ 15.6° C. (60° F.)[f] | 36.9/38.7 | 37.4/40.2 | 41.5/43.6 |
| Specific Gravity | | | |
| @ 15.6° C. (60° F.)[f] | 0.831/0.842 | 0.824/0.838 | 0.808/0.818 |
| @ 25° C. (77° F.)[f] | 0.825/0.835 | 0.817/0.832 | 0.802/0.811 |
| Flash point[g], °C./°F. | 154/310 | 152/305 | 129/265 |
| Pour Point[h], °C./°F. | $-9$/15 | $-9$/15 | $-1$/30 |
| Initial BP[i], °C./°F. | 233.9/453 | 228.9/444 | 220/428 |
| 50% BP[i], °C./°F. | 348.9/660 | 336.1/637 | 289.4/553 |
| Final BP[i], °C./°F. | 523.9/975 | 515/959 | 425/797 |
| Total Paraffins, wt. %[j] | 35.7 | 39.3 | 56.6 |
| n-Paraffins, wt. %[k] | 6.32 | 8.52 | 24.36 |
| Mononaphthenes, wt. %[j] | 42.2 | 40.5 | 29.4 |
| Polynaphthenes, wt. %[j] | 21.8 | 20.1 | 13.8 |
| Aromatics, wt. %[j] | 0.3 | 0.1 | 0.3 |
| Carbon Number Distribution[l] | | | | | |
| C#[m] | Wt. %[n] | C#[m] | Wt. %[n] | C#[m] | Wt. %[n] |
| 11 | 0.13 | 11 | 0.14 | 11 | 0.15 |
| 12 | 0.15 | 12 | 0.17 | 12 | 0.26 |
| 13 | 0.26 | 13 | 0.35 | 13 | 1.29 |
| 14 | 0.59 | 14 | 0.96 | 14 | 5.38 |
| 15 | 1.74 | 15 | 2.93 | 15 | 14.36 |
| 16 | 3.97 | 16 | 6.15 | 16 | 24.21 |
| 17 | 7.19 | 17 | 9.89 | 17 | 30.22 |
| 18 | 9.31 | 18 | 12.94 | 18 | 17.30 |
| 19 | 9.73 | 19 | 11.83 | 19 | 3.70 |
| 20 | 12.60 | 20 | 12.05 | 20 | 1.00 |
| 21 | 14.51 | 21 | 12.28 | 21 | 0.59 |
| 22 | 13.68 | 22 | 11.04 | 22 | 0.42 |
| 23 | 9.97 | 23 | 7.72 | 23 | 0.26 |
| 24 | 5.62 | 24 | 4.38 | 24 | 0.14 |

TABLE I-continued

Exemplary White Oil Properties

| Property | Drakeol 5[a] | | Draketex 50[b] | | Peneteck[c] | |
|---|---|---|---|---|---|---|
| | 25 | 2.83 | 25 | 2.26 | 25 | 0.08 |
| | 26 | 1.62 | 26 | 1.19 | 26 | 0.06 |
| | 27 | 1.21 | 27 | 0.73 | 27 | 0.06 |
| | 28 | 1.00 | 28 | 0.50 | 28 | 0.05 |
| | 29 | 0.75 | 29 | 0.37 | >28 | 0.48 |
| | 30 | 0.52 | 30 | 0.28 | | |
| | 31 | 0.38 | 31 | 0.23 | | |
| | 32 | 0.31 | 32 | 0.20 | | |
| | 33 | 0.29 | 33 | 0.19 | | |
| | 34 | 0.22 | 34 | 0.15 | | |
| | 35 | 0.23 | 35 | 0.16 | | |
| | 36 | 0.18 | 36 | 0.13 | | |
| | 37 | 0.16 | 37 | 0.12 | | |
| | 38 | 0.12 | 38 | 0.10 | | |
| | 39 | 0.13 | 39 | 0.10 | | |
| | 40 | 0.09 | >39 | 0.48 | | |
| | 41 | 0.08 | | | | |
| | >41 | 0.43 | | | | |
| n-Paraffin Carbon Number Distribution[k] | | | | | | |
| C#[j] | Wt. %[k] | C#[j] | Wt. %[k] | C#[j] | Wt. %[k] | |
| 10 | 0.01 | 10 | 0.14 | 10 | 0.01 | |
| 11 | 0.01 | 11 | 0.01 | 11 | 0 | |
| 12 | 0.02 | 12 | 0.02 | 12 | 0.21 | |
| 13 | 0.02 | 13 | 0.03 | 13 | 2.75 | |
| 14 | 0.06 | 14 | 0.14 | 14 | 1.99 | |
| 15 | 0.34 | 15 | 0.67 | 15 | 1.03 | |
| 16 | 1.00 | 16 | 1.73 | 16 | 0.33 | |
| 17 | 1.60 | 17 | 2.41 | 17 | 0.11 | |
| 18 | 1.19 | 18 | 1.54 | 18 | 0.04 | |
| 19 | 1.08 | 19 | 1.09 | 19 | 0.02 | |
| 20 | 0.50 | 20 | 0.42 | 20 | 0.01 | |
| 21 | 0.19 | 21 | 0.18 | | | |
| 22 | 0.15 | 22 | 0.14 | | | |
| 23 | 0.09 | 23 | 0.08 | | | |
| 24 | 0.03 | 24 | 0.03 | | | |
| 25 | 0.01 | 25 | 0.02 | | | |
| 26 | 0.01 | 26 | 0.01 | | | |
| 27 | 0 | | | | | |
| 28 | 0.01 | | | | | |
| 29 | 0.01 | | | | | |

[a]Drakeol 5 is a trademark of Pennzoil Products Company. Drakeol 5 brand white mineral oil meets the following FDA regulations: 21 CFR 172.878 covering direct use in food, 178.3620 for indirect use in food, and 573.680 for use in animal feed.
[b]Draketex 50 is a trademark of Pennzoil Products Company. Draketex 50 brand white mineral oil meets the following FDA regulations: 21 CFR 172.878 covering direct use in food, 178.3620 for indirect use in food, and 573.680 for use in animal feed.
[c]Peneteck is a trademark of Pennzoil Products Company. Peneteck brand white mineral oil meets the following FDA regulations: 21 CFR 172.878 covering direct use in food, 178.3620 for indirect use in food, and 573.680 for use in animal feed.
[d]Determined in accordance with ASTM D 445; SUS denotes Saybolt Universal Scale.
[e]Determined in accordance with ASTM D 445; CST denotes centistokes.
[f]Determined in accordance with ASTM D 1298.
[g]Determined in accordance with ASTM D 92.
[h]Determined in accordance with ASTM D 97.
[i]Determined in accordance with ASTM D 2887; BP denotes boiling point.
[j]Determined in accordance with UTM 407-90.
[k]Determined by the procedure of Attachment A.
[l]Determined in accordance with ASTM D 2887.
[m]C# denotes carbon number.
[n]Wt. % denotes weight percent.

White mineral oils are generally prepared by removing, by either acid treatment or hydrogenation, unsaturates and aromatics from oil feedstocks. In an exemplary process, the feedstock oil is treated with large quantities of concentrated or fuming sulfuric acid. The reaction product (namely, oil-soluble sulfonic acid), after caustic neutralization and purification, becomes petroleum sulfonate. The unreacted material (i.e., oil feedstock components which do not react with the sulfuric acid) are the saturated aliphatic and naphthenic hydrocarbons which constitute the white mineral oil. Additional details pertinent to the preparation of white mineral oils are discussed in Meyer, "White Mineral Oil and Petrolatum," Chemical Publishing Co., Inc., Brooklyn, N.Y. (1950) and Biske et al., "White Oil Manufacture," Proceedings Fourth World Petroleum Congress-Section III/A, each of these publications being incorporated herein in their entireties by reference.

Optionally, one or more pour point depressants are employed in the drilling fluid of the present invention to lower the pour point of the white mineral oil. Typical pour point depressants include, but are not limited to, ethylene copolymers, isobutylene polymers, polyaklylnaphthalenes, wax-aromatic condensation products (e.g., wax-naphthalene condensation products, phenol-wax condensation products), polyalkylphenolesters, polyalkylmethacrylates, polymethacrylates, polyalkylated condensed aromatics, alkylaromatic polymers, iminodiimides, and polyalkylstyrene. (The molecular weights for polyaklylnaphthalenes, polyalkylphenolesters, and polyalkylmethacrylates range from about 2,000 to about 10,000.) Because they are non-toxic, ethylene copolymers and isobutylene polymers are the preferred pour point depressants.

Up to about 1 weight percent pour point depressant is employed. (As used in the specification and claims, the weight percent of the pour point depressant is based upon the weight of the white mineral oil in the drilling fluid, i.e., it is the weight of the pour point depressant divided by the weight of the white mineral oil in the drilling fluid, the quotient being multiplied by 100%.) Preferably, the pour point depressant is employed in a concentration of 0,005 to about 0.5, more preferably about 0.01 to about 0.4, and most preferably about 0.02 to about 0.3, weight percent.

When employed, the pour point depressant is preferably mixed with the white mineral oil and the resulting composition is then combined with any additional additives as described below.

One or more emulsifiers, wetting agents, viscosifiers, weighting agents, fluid loss control agents, and shale inhibiting salts are also optionally used in the oil-based drilling fluid of the present invention. Exemplary emulsifiers include, but are not limited to, fatty acids, soaps of fatty acids, and fatty acid derivatives including amido-amines, polyamides, polyamines, esters (such as sorbitan monoleate polyethoxylate, sorbitan dioleate polyethoxylate), imidaxolines, and alcohols.

Typical wetting agents include, but are not limited to, lecithin, fatty acids, crude tall oil, oxidized crude tall oil, organic phosphate esters, modified imidazolines, modified amidoamines, alkyl aromatic sulfates, alkyl aromatic sulfonates, and organic esters of polyhydric alcohols.

Exemplary viscosifiers include, but are not limited to, organophilic clays (e.g., hectorite, bentonite, and attapulgite), oil soluble polymers, polyamide resins, and polycarboxylic acids and soaps. For drilling fluids intended for use in high temperature environments (e.g., where the bottom hole temperature exceeds about 204.4° C. (400° F.)), it is desirable to employ a sulfonated elastomer polymeric viscosifier. Preferably, the sulfonated elastomer polymeric viscosifier is a neutralized sulfonated elastomer polymer having about 5 to about 100 milliequivalents of sulfonate groups per 100 g of sulfonated polymer. More preferably, the neutralized sulfonated elastomer polymer has about 5 to about 50 milliequivalents, and most preferably about 5 to about 30 milliequivalents, of sulfonate groups per 100 g of sulfonated polymer.

Preferably, the sulfonated elastomer polymeric viscosifier is derived from an elastomer polymer selected from the group consisting of ethylene-propylene-diene monomer (EPDM) terpolymers, copolymers of isoprene and styrene sulfonate salt, copolymers of chloroprene and styrene sulfonate salt, copolymers of isoprene and butadiene, copolymers of styrene and styrene sulfonate salt, copolymers of butadiene and styrene sulfonate salt, copolymers of butadiene and styrene, terpolymers of isoprene, styrene, and styrene sulfonate salt, terpolymers of butadiene, styrene, and styrene sulfonate salt, butyl rubber, partially hydrogenated polyisoprenes, partially hydrogenated polybutylene, partially hydrogenated natural rubber, partially hydrogenated buna rubber, partially hydrogenated polybutadienes, and Neoprene. Methods for obtaining and characteristics of sulfonated elastomer polymers are known to those skilled in the art. See, for example, U.S. Pat. No. 4,447,338, U.S. Pat. No. 4,425,462, U.S. Pat. No. 4,153,588, U.S. Pat. No. 4,007,149, U.S. Pat. No. 3,912,683, and UK Patent Application 2,212,192, these documents being incorporated in their entirety by reference.

Exemplary weighting agents include, but are not limited to barite, iron oxide, gelana, siderite, and calcium carbonate.

Illustrative fluid loss control agents include, but are not limited to, asphaltics (e.g., asphaltenes and sulfonated asphaltenes), amine treated lignite, and gilsonite. For drilling fluids intended for use in high temperature environments (e.g., where the bottom hole temperature exceeds about 204.4° C. (400° F.)), the fluid loss control agent is preferably a polymeric fluid loss control agent. Exemplary polymeric fluid loss control agents include, but are not limited to, polystyrene, polybutadiene, polyethylene, polypropylene, polybutylene, polyisoprene, natural rubber, butyl rubber, polymers consisting of at least two monomers selected from the group consisting of styrene, butadiene, isoprene, and vinyl carboxylic acid. Individual or mixtures of polymeric fluid loss control agents can be used in the oil base drilling fluid of this invention.

The preferred polymeric fluid loss control agents are styrene-butadiene copolymers. Characteristics of exemplary styrene-butadiene copolymers are listed in the following Table II:

TABLE II

| Characteristic | Exemplary Styrene-Butadiene Copolymers | | | |
|---|---|---|---|---|
| Styrene/-Butadiene Ratio | 50/50 | 57/43 | 90/10 | 67/33 |
| Surfactant Type | Anionic | Anionic | Anionic | Anionic |
| Tg, °C. | −22 | −11 | 76 | 12 |
| pH | 9.0 | 6.0 | 6.5 | 9.0 |

All the styrene/butadiene copolymers described in above Table II also contain about 1 to about 3 weight percent copolymerized carboxylic acid (e.g., itaconic acid and acrylic acid).

Common shale inhibiting salts are alkali metal and alkaline-earth metal salts. Calcium chloride and sodium chloride are the preferred shale inhibiting salts.

Typically, the oil-based drilling fluid of the present invention contains the ingredients and properties set forth in the following Table III:

TABLE III

| Ingredient | Typical | More Typical |
|---|---|---|
| Oil, volume %[a] | 25–85 | 50–60 |
| Surfactant (active), pounds per barrel (ppb)[b,g] | 1–20 | 1–10 |
| Water, volume %[a] | up to 45 | 10–20 |
| Weighting agent, ppb | up to 600 | 150–400 |
| Organophilic clay, ppb | 0.5–30 | 1–10 |
| Non-polymeric fluid loss control agent, ppb | up to 30 | 2–15 |
| Polymeric fluid loss control agent, ppb[c] | 3–12 | 5–10 |
| Sulfonated elastomer polymeric viscosifier, ppb[d] | 0.02–2 | 0.05–1.5 |
| Shale inhibiting salt, ppb | up to 60 | 20–30 |
| Lime, ppb[e] | up to 30 | 1–10 |
| Property Density, ppg[f] | 7.5–20 | 9–16 |

[a]Volume percent is based on the total volume of the drilling fluid.
[b]As used in the specification and claims, the term "surfactant" means a substance that, when present at low concentration in a system, has the property of adsorbing onto the surfaces or interfaces of the system and of altering to a marked degree the surface or interfacial free energies of those surfaces (or interfaces). As used in the foregoing definition of surfactant, the term "interface" indicates a boundary between any two immiscible phases and the term "surface" denotes an interface where one phase is a gas, usually air. Exemplary ingredients referred to as surfactants by those skilled in the art include emulsifiers and oil wetting agents.
[c]The polymeric fluid loss control agent is preferably present in the drilling fluid in a concentration of about 6 to about 9 ppb.
[d]The sulfonated elastomer polymeric viscosifier is preferably present in the drilling fluid in a concentration of about 0.1 to about 1 ppb.
[e]As used in the specification and claims, the term "lime" means quicklime (CaO), quicklime precursors, and hydrated quicklime (e.g., slaked lime (Ca(OH)$_2$)).
[f]ppg denotes pounds per gallon.
[g]The pound per barrel (ppb) is based upon the final composition of the drilling fluid.

The volumetric ratio of oil to water in the drilling fluid of the present invention can be as low as about 50:50.

Preferably, the weight ratio of the polymeric fluid loss control agent to the sulfonated elastomer polymeric viscosifier is about 1.5:1 to about 50:1, more preferably about 3:1 to about 20:1, and most preferably about 5:1 to about 10:1.

The drilling fluid is preferably prepared by mixing the constituent ingredients in the following order: (a) white mineral oil, (b) organophilic clay, (c) surfactant, (d) lime, (e) an aqueous solution comprising water and the shale inhibiting salt, (f) non-polymeric fluid loss control agent, (g) weighting agent, (h) polymeric fluid loss control agent, and (i) sulfonated elastomer polymeric viscosifier.

While it is preferred that the entire base oil of the drilling fluid consist solely of the white mineral oil (and any optional pour point depressant), the white mineral oil can constitute a portion of the base oil. Preferably, the white mineral oil constitutes at least about 50, more preferably at least about 75, even more preferably at least about 90, and most preferably at least about 95, weight percent of the base oil. (As used in the specification and claims, the term "weight percent" in the context of the concentration of the white mineral oil in the base oil means the weight of the white oil used in the drilling fluid divided by the weight of all oils employed to formulate the base oil component of the drilling fluid, the quotient being multiplied by 100 percent.) It follows that the base oil can consist of about 96, 97, 98, 99, or more, weight percent white mineral oil.

EXAMPLES

The following examples (which are intended to illustrate and not limit the invention, the invention being defined by the claims) demonstrate the preparation and properties of exemplary drilling fluids within the scope of the present invention.

EXAMPLES 1–3

Preparation And Initial Properties Of Drilling Fluids

Low toxicity, oil-based drilling fluids were prepared using non-toxic, food grade white oils as the base.

Each drilling fluid was an invert emulsion prepared by (a) initially agitating about 240 ml of a non-toxic, food grade white oil for about 1 minute using a Multi-Mixer brand blender and (b) then sequentially adding the following ingredients (with continuous mixing for about one minute after the addition of each material): (i) about 6 g of Invermul NT brand primary emulsifier (available from Baroid Drilling Fluids, Inc. (Baroid)); (ii) about 8 g of lime (calcium hydroxide); and (iii) about 4 g of Duratone HT brand fluid-loss preventing agent (i.e., a chemically modified lignite (humate) available from Baroid).

Subsequently, about 39 ml of fresh water was added to the above mixture and the resulting composition was mixed for about ten minutes. Then, about 11 g of Geltone II brand amine-treated bentonite (available from Baroid) was added and the resulting matter was agitated for about 15 minutes.

Thereafter, the following materials were added in sequence, with about 5 minutes of mixing after the addition of each of the materials: (i) about 2 g of EZ Mul NT brand secondary emulsifier (available Baroid); (ii) about 210 g of powdered barite (a non-toxic weighting agent); (iii) about 24 g of calcium chloride dihydrate (to provide salinity to the water phase without water wetting the barite); and (iv) about 20 g of a powdered clay (composed of about 35 weight percent smectite and about 65 weight percent kaolinite) to simulate drilled formation particles.

The rheological properties of each of the three initial drilling fluids was determined at about 65.6° C. (150° F.) and are set forth below in Table A.

TABLE A

| | Initial Rheological Properties | | |
|---|---|---|---|
| | Drilling Fluid | | |
| Parameter | A[a] | B[b] | C[c] |
| Fann Viscometer Dial Reading at:[d] | | | |
| 600 RPM | 100 | 93 | 60 |
| 300 RPM | 62 | 55 | 35 |
| 3 RPM | 12 | 11 | 6 |
| Plastic Viscosity[e], N-sec/m$^2$/centipoise | 0.038/38 | 0.038/38 | 0.025/25 |
| Yield Point[f], kg/9.29 m$^2$/lb/100 ft$^2$ | 10.9/24 | 7.7/17 | 4.5/10 |
| 10 Second Gel Strength[g], kg/9.29 m$^2$/lb/100 ft$^2$ | 6.8/15 | 5.9/13 | 3.2/7 |
| 10 Minute Gel Strength, kg/9.29 m$^2$/lb/100 ft$^2$ | 10.0/22 | 9.1/20 | 5.0/11 |
| Density, lb/gal/kg/1 lb./gallon | 1.4/11.8 | 1.4/11.8 | 1.4/11.8 |
| HTHP Filtrate at 148.9° C. (300° F.) and 3548.7 kpascal (500 psig)[h], ml | 9 | 10 | 11 |

TABLE A-continued

| | Initial Rheological Properties | | |
|---|---|---|---|
| | Drilling Fluid | | |
| Parameter | A[a] | B[b] | C[c] |
| Emulsion Stability[i], volt | 1203 | 1258 | 987 |

[a]"A" is Drakeol 5 brand white mineral oil.
[b]"B" is Draketex 50 brand white mineral oil.
[c]"C" is Peneteck brand white mineral oil.
[d]Dial readings were obtained using a 115-volt motor driven viscometer described in Recommended Practice - Standard Procedure for Field Testing Drilling Fluids, Recommended Practice 13B (RP13B), Twelfth Edition, September 1, 1988, American Petroleum Institute, Washington DC (hereinafter referred to as "API"), pages 7-9, sections 2.4 to 2.5.
[e]PV was determined in accordance with the procedure and calculations discussed in API, page 9, sections 2.5 to 2.6.
[f]YP was determined in accordance with the procedure and calculations discussed in API, page 9, sections 2.5 to 2.6.
[g]Gel strength for 10 seconds and 10 minutes was determined in accordance with the procedure discussed in API, page 9, section 2.5, paragraphs f and g, respectively.
[h]HTHP (High-Temperature/High-Pressure) Filtrate was determined in accordance with the procedure discussed in API, page 12, section 3.5.
[i]Emulsion stability was measured according to the procedure described in API, page 28.

EXAMPLE 4–6

Age Tested Drilling Fluid Properties

Aging Methodology

Each of the three above-prepared drilling fluids was age tested in accordance with the following protocol. A portion of the drilling fluid was transferred to a stainless steel vessel which was then pressurized with nitrogen to about 790.8 kpascal (100 psig). The pressurized, drilling fluid-containing vessel was placed on a rolling apparatus inside an oven set at about 65.6° C. (150° F.) for about 16 hours of aging. The rheological properties for each of the aged drilling fluids are listed in the following Table B.

TABLE B

| | Aged Rheological Properties | | |
|---|---|---|---|
| | Drilling Fluid | | |
| Parameter | A[a] | B[b] | C[c] |
| Fann Viscometer Dial Reading at:[d] | | | |
| 600 RPM | 110 | 100 | 68 |
| 300 RPM | 66 | 60 | 39 |
| 3 RPM | 12 | 50 | 6 |
| Plastic Viscosity[e], N-sec/m²/centipoise | 0.044/44 | 0.040/40 | 0.029/29 |
| Yield Point[f], kg/9.29 m²/lb/100 ft² | 10.0/22 | 9.1/20 | 4.5/10 |
| 10 Second Gel Strength[g], kg/9.29 m²/lb/100 ft² | 6.8/15 | 6.4/14 | 3.6/8 |
| 10 Minute Gel Strength, kg/9.29 m²/lb/100 ft² | 10.9/24 | 10.4/23 | 6.4/14 |
| Density, lb/gal/kg/1 lb./gallon | 1.4/11.8 | 1.4/11.8 | 1.4/11.8 |
| Filtrate at 148.9° C. (300° F.) and 3548.7 kpascal (500 psig)[h], ml | 12 | 7 | 16 |
| Emulsion Stability[i], volt | 1454 | 1502 | 1227 |

[a]-[i]See above Table A.

The initial and aged rheological properties of each of the three exemplary oil-based drilling fluids of the present invention are appropriate for an oil-based drilling fluid. For example, the low initial and aged plastic viscosities indicate that each of the exemplary drilling muds can maintain low pumping pressures and the high initial and aged yield points and gel strengths show that each drilling mud can effectively suspend solids to clean boreholes.

Although the present invention has been described in detail with reference to some preferred versions, other versions are possible. For example, the white mineral oil can also be employed as the base oil component in other wellbore fluids. (As used in the specification and claims, the term "wellbore fluid" means a fluid used while conducting pay zone drilling, underreaming, drilling in, plugging back, sand control, perforating, gravel packing, chemical treatment, hydraulic fracturing, cleanout, well killing, tubing and hardware replacement, and zone selective operations (e.g., well completion operations) as well as a fluid employed as a packer fluid.) In addition to the base oil, the wellbore fluids contain one or more additional ingredients such as proppants suitable for use in hydraulically fracturing subterranean formations, particulate agents suitable for use in forming a gravel pack, viscosifiers, organophilic clays, and fluid loss control agents.

Common proppants suitable for use in hydraulic fracturing procedures are quartz sand grains, tempered glass beads, sintered bauxite, resin coated sand, aluminum pellets, and nylon pellets. Generally, the proppants are employed in the wellbore fluids intended for use as hydraulic fracturing fluids and are used in concentrations of roughly about 1 to about 10 pounds per gallon of the wellbore fluid. The proppant size is typically smaller than about 2 mesh on the U.S. Sieve Series scale, with the exact size selected being dependent on the particular type of formation to be fractured, the available pressure and pumping rates, as well as other factors known to those skilled in the art.

Typical particulate agents employed in the wellbore fluids used as gravel packing fluids include, but are not limited to, quartz sand grains, glass beads, synthetic resins, resin coated sand, walnut shells, and nylon pellets. The gravel pack particulate agents are generally used in concentrations of about 1 to about 20 pounds per gallon of the wellbore fluid. The size of the particulate agent employed depends on the type of subterranean formation, the average size of formation particles, and other parameters known to those skilled in the art. Generally, particulate agents of about 8 to about 70 mesh on the U.S. Sieve Series scale are used.

Illustrative viscosifiers, organophilic clays, and fluid loss control agents optionally used in wellbore fluids and their concentrations are the same as discussed above in connection with drilling fluids.

The wellbore fluids are prepared by combining the white mineral oil and pour point depressant (when used) and adding any additional additive (e.g., hydraulic fracturing proppants, gravel pack particulate agents, viscosifiers, fluid loss control agents, and organophilic clays) is usually added to resulting combination.

The specific techniques used when employing the wellbore fluid are determined by its intended use and are analogous to methodologies employed when using prior art wellbore fluids for corresponding completion or work-over operations. For example, when the wellbore fluid is employed as a gravel packing fluid, it is typically injected into the formation in accordance with the procedure discussed in U.S. Pat. No. 4,552,215, this patent being incorporated herein in its entirety by reference.

When employed as a fracturing fluid, the wellbore fluid of the present invention is usually injected into the formation using procedures analogous to those disclosed in U.S. Pat. Nos. 4,488,975, 4,553,601, Howard et al., *Hydraulic Fracturing*, Society of Petroleum Engineers of the American Institute of Mining, Metallurgical, and Petroleum Engineers, Inc., New York, N.Y.

(1970), and Allen et al., *Production Operations, Well completions, Workover, and Stimulation*, 3rd Edition, volume 2, Oil & Gas Consultants International, Inc., Tulsa, Okla. (1989) (Allen), chapter 8, these publications being incorporated herein in their entirety by reference.

When employed in a perforating operation, the wellbore fluid of the present invention is used according to the methodologies disclosed in chapter 7 of Allen, referenced above.

Techniques for using packer fluids and well killing fluids, such as those discussed in chapter 8 of Allen, are also applicable to the wellbore fluid of the present invention.

In view of the foregoing numerous other embodiments, the spirit and scope of the appended claims should not necessarily be limited to the description of the preferred versions contained herein.

Attachment A

Normal Hydrocarbons In Petroleum Products By Gas Chromatography

Normal hydrocarbons can be determined in petroleum products using gas chromatography with a flame ionization detector (FID). A capillary column 12.5 meters long, 0.32 mm id., and with a 0.5 μm film of Ohio Valley brand OV-1 silicon polymer or an equivalent stationary phase is used.

Column conditions are set as follows:
  Injector: 350° C. Split flow set at 170 ml/min. Head pressure set at 170.27 kpascal (10 psig)
  Detector: FID at 350° C.
  Oven: 100 degrees 2 minutes then 8 degrees/min. to 300 degrees. Hold at 300 degrees for 15 minutes.
Injection size is 1 μL.
Sample preparation:
  Internal standard: 0.2xxx g p-terphenyl is dissolved in 100 mL toluene. This does not dissolve quickly and may take overnight.
  Sample: A 1 dram vial is tarred and 0.5xxx g of sample is weighed into the vial. 2.00 mL of the internal standard solution is-added to this. Shake well to completely dissolve the sample. Warming may be required for some samples.
Analysis:
  Inject 1 μL into the gas chromatograph and start the run. Check that all normal hydrocarbons and p-terphenyl are correctly identified. The relative response factor between p-terphenyl and the normal hydrocarbons should have been determined in a previous run from a sample prepared to have a known composition. Integrate all identified peaks from valley to valley. The amount of each hydrocarbon is calculated from the relative peak areas as compared to the internal standard and the amount of the internal standard.

What is claimed is:

1. A wellbore fluid comprising:
  (a) at least one additive selected from the group consisting of emulsifiers, wetting agents, viscosifiers, weighting agents, fluid loss control agents, proppants for use in hydraulically fracturing subterranean formations, and particulate agents for use in forming a gravel pack; and
  (b) a white mineral oil having (i) an API gravity at 15.6° C. (60° F.) greater than 35, (ii) a content of compounds containing 14 or more carbon atoms of at least about 95 weight percent, and (iii) a pour point of at least about −30° C. (−22° F.).

2. The wellbore fluid of claim 1 wherein the white mineral oil has a n-paraffinic content greater than 5 weight percent.

3. The wellbore fluid of claim 1 wherein the white mineral oil comprises at least about 10 weight percent compounds containing 18 or more carbon atoms.

4. The wellbore fluid of claim 1 wherein the white mineral oil comprises at least about 15 weight percent compounds containing 18 or more carbon atoms.

5. The wellbore fluid of claim 1 wherein the white mineral oil comprises at least about 20 weight percent compounds containing 18 or more carbon atoms.

6. The wellbore fluid of claim 1 wherein the white mineral oil comprises at least about 96 weight percent compounds containing 14 or more carbon atoms.

7. The wellbore fluid of claim 1 wherein the white mineral oil comprises at least about 97 weight percent compounds containing 14 or more carbon atoms.

8. The wellbore fluid of claim 1 wherein the white mineral oil comprises at least about 98 weight percent compounds containing 14 or more carbon atoms.

9. The wellbore fluid of claim 1 wherein the white mineral oil has a characterization factor greater than 12.

10. The wellbore fluid of claim 1 wherein the white mineral oil has a characterization factor of at least about 12.1.

11. The wellbore fluid of claim 1 wherein the white mineral oil has a characterization factor of at least about 12.2.

12. The wellbore fluid of claim 1 wherein the white mineral oil has an API gravity at 15.6° C. (60° F.) greater than about 35.1.

13. The wellbore fluid of claim 1 wherein the white mineral oil has an API gravity at 15.6° C. (60° F.) greater than about 35.25.

14. The wellbore fluid of claim 1 wherein the white mineral oil has an API gravity at 15.6° C. (60° F.) greater than about 35.5.

15. The wellbore fluid of claim 1 further comprising a pour point depressant.

16. A drilling system comprising:
  (A) at least one subterranean formation;
  (B) a borehole penetrating a portion of at least one of the subterranean formations;
  (C) a drill bit suspended in the borehole; and
  (D) a drilling fluid located in the borehole and proximate the drill bit, wherein the drilling fluid comprises:
    (a) at least one additive selected from the group consisting of emulsifiers, wetting agents, viscosifiers, weighting agents, and fluid loss control agents; and
    (b) a white mineral oil having (i) an API gravity at 15.6° C. (60° F.) greater than 35, (ii) a content of compounds containing 14 or more carbon atoms of at least about 95 weight percent, and (iii) a pour point of at least about −30° C. (−22° F.).

17. A method for drilling a borehole in a subterranean formation, the method comprising the steps of:
  (A) rotating a drill bit at the bottom of the borehole; and
  (B) introducing a drilling fluid into the borehole (α) to pick up drill cuttings and (β) to carry at least a portion of the drilling cuttings out of the borehole, wherein the drilling fluid comprises:

(a) at least one additive selected from the group consisting of emulsifiers, wetting agents, viscosifiers, weighting agents, and fluid loss control agents; and (b) a white mineral oil having (i) an API gravity at 15.6° C. (60° F.) greater than 35, (ii) a content of compounds containing 14 or more carbon atoms of at least about 95 weight percent, and (iii) a pour point of at least about −30° C. (−22° F.).

18. The wellbore fluid of claim 1 wherein the wellbore fluid is a drilling fluid comprising a base oil, at least one additive selected from the group consisting of emulsifiers, wetting agents, viscosifiers, weighting agents, and fluid loss control agents, and the white mineral oil constitutes at least about 99 weight percent of the base oil.

19. A natural resource system comprising:
(a) a subterranean formation;
(b) a well penetrating at least a portion of the subterranean formation; and
(c) a wellbore fluid present in at least a portion of the well, wherein the wellbore fluid comprises:
  (A) at least one additive selected from the group consisting of emulsifiers, wetting agents, viscosifiers, weighting agents, fluid loss control agents, proppants for use in hydraulically fracturing subterranean formations, and particulate agents for use in forming a gravel pack; and
  (B) a white mineral oil having (i) an API gravity at 15.6° C. (60° F.) greater than 35, (ii) a content of compounds containing 14 or more carbon atoms of at least about 95 weight percent, and (iii) a pour point of at least about −30° C. (−22° F.).

20. A natural resource system comprising:
(a) a subterranean formation;
(b) a wellbore penetrating at least a portion of the subterranean formation;
(c) a casing positioned within at least a portion of the wellbore; and
(d) wellbore fluid present in at least a portion of the area between the surface of the wellbore and the outside surface of the casing, wherein the wellbore fluid comprises:
  (A) at least one additive selected from the group consisting of emulsifiers, wetting agents, viscosifiers, weighting agents, fluid loss control agents, proppants for use in hydraulically fracturing subterranean formations, and particulate agents for use in forming a gravel pack; and
  (B) a white mineral oil having (i) an API gravity at 15.6° C. (60° F.) greater than 35, (ii) a content of compounds containing 14 or more carbon atoms of at least about 95 weight percent, and (iii) a pour point of at least about −30° C. (−22° F.).

21. A natural resource system comprising:
(a) a subterranean formation;
(b) a wellbore penetrating at least a portion of the subterranean formation;
(c) a casing positioned within at least a portion of the wellbore; and
(d) a wellbore fluid present in at least a portion of the subterranean formation proximate the wellbore, wherein the wellbore fluid comprises:
  (A) at least one additive selected from the group consisting of emulsifiers, wetting agents, viscosifiers, Weighting agents, fluid loss control agents, proppants for use in hydraulically fracturing subterranean formations, and particulate agents for use in forming a gravel pack; and
  (B) a white mineral oil having (i) an API gravity at 15.6° C. (60° F.) greater than 35, (ii) a content of compounds containing 14 or more carbon atoms of at least about 95 weight percent, and (iii) a pour point of at least about −30° C. (−22° F.).

22. The wellbore fluid of claim 1 wherein the white mineral oil has a characterization factor of at least about 12.3.

23. The wellbore fluid of claim 1 wherein the white mineral oil has a characterization factor of about 12 to about 13.

24. The wellbore fluid of claim 1 wherein the white mineral oil has a characterization factor of about 12.1 to about 12.9.

25. The wellbore fluid of claim 1 wherein the white mineral oil has a characterization factor of about 12.2 to about 12.8.

26. The wellbore fluid of claim 1 wherein the white mineral oil has a characterization factor of about 12.3 to about 12.7.

27. The wellbore fluid of claim 1 wherein the white mineral oil has an API gravity at 15.6° C. (60° F.) greater than about 35.75.

28. The wellbore fluid of claim 1 wherein the white mineral oil has an API gravity at 15.6° C. (60° F.) greater than about 36.

29. The wellbore fluid of claim 1 wherein the white mineral oil has an API gravity at 15.6° C. (60° F.) of about 35 to about 50.

30. The wellbore fluid of claim 1 wherein the white mineral oil has an API gravity at 15.6° C. (60° F.) of about 35.25 to about 45.

31. The wellbore fluid of claim 1 wherein the white mineral oil has an API gravity at 15.6° C. (60° F.) of about 35.5 to about 44.75.

32. The wellbore fluid of claim 1 wherein the white mineral oil has an API gravity at 15.6° C. (60° F.) of about 35.75 to about 44.5.

33. The wellbore fluid of claim 1 wherein the white mineral oil has a n-paraffinic content greater than about 5.25 weight percent.

34. The wellbore fluid of claim 1 wherein the white mineral oil has a n-paraffinic content greater than about 5.5 weight percent.

35. The wellbore fluid of claim 1 wherein the white mineral oil has a n-paraffinic content greater than about 5.75 weight percent.

36. The wellbore fluid of claim 1 wherein the white mineral oil has a n-paraffinic content greater than about 6 weight percent.

37. The wellbore fluid of claim 1 wherein the white mineral oil has a n-paraffinic content greater than about 10 weight percent.

38. The wellbore fluid of claim 1 wherein the white mineral oil has a n-paraffinic content greater than about 15 weight percent.

39. The wellbore fluid of claim 1 wherein the white mineral oil has a n-paraffinic content greater than about 20 weight percent.

40. The wellbore fluid of claim 1 wherein the white mineral oil has a total paraffinic content greater than about 25 weight percent.

41. The wellbore fluid of claim 1 wherein the white mineral oil has a total paraffinic content greater than about 30 weight percent.

42. The wellbore fluid of claim 1 wherein the white mineral oil has a total paraffinic content greater than about 33 weight percent.

43. The wellbore fluid of claim 1 wherein the white mineral oil has a total paraffinic content greater than about 35 weight percent.

44. The wellbore fluid of claim 1 wherein the white mineral oil has a total paraffinic content of about 25 to about 70 weight percent.

45. The wellbore fluid of claim 1 wherein the white mineral oil has a total paraffinic content of about 30 to about 65 weight percent.

46. The wellbore fluid of claim 1 wherein the white mineral oil has a total paraffinic content of about 33 to about 60 weight percent.

47. The wellbore fluid of claim 1 wherein the white mineral oil has a total paraffinic content of about 35 to about 58 weight percent.

48. The wellbore fluid of claim 1 wherein the white mineral oil has a mononaphthenic content of about 20 to about 50 weight percent.

49. The wellbore fluid of claim 1 wherein the white mineral oil has a mononaphthenic content of about 25 to about 45 weight percent.

50. The wellbore fluid of claim 1 wherein the white mineral oil has a mononaphthenic content of about 27 to about 44 weight percent.

51. The wellbore fluid of claim 1 wherein the white mineral oil has a mononaphthenic content of about 29 to about 43 weight percent.

52. The wellbore fluid of claim 1 wherein the white mineral oil has a polynaphthenic content of about 5 to about 30 weight percent.

53. The wellbore fluid of claim 1 wherein the white mineral oil has a polynaphthenic content of about 10 to about 25 weight percent.

54. The wellbore fluid of claim 1 wherein the white mineral oil has a polynaphthenic content of about 12 to about 23 weight percent.

55. The wellbore fluid of claim 1 wherein the white mineral oil has a polynaphthenic content of about 13 to about 22 weight percent.

56. The wellbore fluid of claim 1 wherein the white mineral oil has a total naphthenic content of about 30 to about 75 weight percent.

57. The wellbore fluid of claim 1 wherein the white mineral oil has a total naphthenic content of about 35 to about 70 weight percent.

58. The wellbore fluid of claim 1 wherein the white mineral oil has a total naphthenic content of about 40 to about 67 weight percent.

59. The wellbore fluid of claim 1 wherein the white mineral oil has a total naphthenic content of about 42 to about 65 weight percent.

60. The wellbore fluid of claim 1 wherein the white mineral oil comprises at least about 24 weight percent compounds containing 18 or more carbon atoms.

61. The wellbore fluid of claim 1 wherein the white mineral oil comprises at least about 70 weight percent compounds containing 18 or more carbon atoms.

62. The wellbore fluid of claim 1 wherein the white mineral oil comprises at least about 75 weight percent compounds containing 18 or more carbon atoms.

63. The wellbore fluid of claim 1 wherein the white mineral oil comprises at least about 80 weight percent compounds containing 18 or more carbon atoms.

64. The wellbore fluid of claim 1 wherein the white mineral oil comprises at least about 85 weight percent compounds containing 18 or more carbon atoms.

65. The wellbore fluid of claim 1 wherein the white mineral oil comprises less than about 30 weight percent compounds containing 15 or less carbon atoms.

66. The wellbore fluid of claim 1 wherein the white mineral oil comprises less than about 27 weight percent compounds containing 15 or less carbon atoms.

67. The wellbore fluid of claim 1 wherein the white mineral oil comprises less than about 25 weight percent compounds containing 15 or less carbon atoms.

68. The wellbore fluid of claim 1 wherein the white mineral oil comprises less than about 23 weight percent compounds containing 15 or less carbon atoms.

69. The wellbore fluid of claim 1 wherein the white mineral oil comprises less than about 15 weight percent compounds containing 15 or less carbon atoms.

70. The wellbore fluid of claim 1 wherein the white mineral oil comprises less than about 10 weight percent compounds containing 15 or less carbon atoms.

71. The wellbore fluid of claim 1 wherein the white mineral oil comprises less than about 5 weight percent compounds containing 15 or less carbon atoms.

72. The wellbore fluid of claim 1 wherein the white mineral oil has an aromatic content less than about 0.5 weight percent.

73. The wellbore fluid of claim 1 wherein the white mineral oil has an aromatic content less than about 0.4 weight percent.

74. The wellbore fluid of claim 1 wherein the white mineral oil has an aromatic content less than about 0.3 weight percent.

75. The wellbore fluid of claim 1 wherein the white mineral oil has an aromatic content less than about 0.2 weight percent.

76. The wellbore fluid of claim 1 wherein the white mineral oil has a pour point greater than about $-25°$ C. ($-13°$ F.).

77. The wellbore fluid of claim 1 wherein the white mineral oil has a pour point greater than about $-20°$ C. ($-4°$ F.).

78. The wellbore fluid of claim 1 wherein the white mineral oil has a pour point greater than about $-15°$ C. ($5°$ F.).

79. The wellbore fluid of claim 1 wherein the white mineral oil has a pour point less than about $0°$ C. ($32°$ F.).

80. The wellbore fluid of claim 1 wherein the white mineral oil has a flash point greater than about $121.1°$ C. ($250°$ F.).

81. The wellbore fluid of claim 1 wherein the white mineral oil has a viscosity at $40°$ C. ($104°$ F.) of about 1 to about 10 centistokes.

82. The wellbore fluid of claim 1 wherein the white mineral oil has a viscosity at $40°$ C. ($104°$ F.) of about 2 to about 6 centistokes.

83. The wellbore fluid of claim 1 wherein the white mineral oil has a viscosity at $40°$ C. ($104°$ F.) of about 3 to about 5 centistokes.

84. The wellbore fluid of claim 1 wherein the white mineral oil has a viscosity at $40°$ C. ($104°$ F.) greater than about 6 centistokes.

85. The wellbore fluid of claim 1 wherein the white mineral oil has a viscosity at $40°$ C. ($104°$ F.) of about 6.1 to about 9.5 centistokes.

86. The wellbore fluid of claim 1 wherein the white mineral oil has a viscosity at 40° C. (104° F.) of about 6.2 to about 9.25 centistokes.

87. The wellbore fluid of claim 1 wherein the white mineral oil has a viscosity at 40° C. (104° F.) of about 6.3 to about 9 centistokes.

88. The wellbore fluid of claim 1 wherein the white mineral oil has a viscosity at 40° C. (104° F.) of about 6.4 to about 8.75 centistokes.

89. The wellbore fluid of claim 1 wherein the white mineral oil has a pour point less than about 0° C. (32° F.), a flash point greater than about 121.1° C. (250° F.), and a viscosity at 40° C. (104° F.) of about 1 to about 10 centistokes.

90. The wellbore fluid of claim 1 further comprising up to 1 weight percent of a pour point depressant.

91. The wellbore fluid of claim 1 further comprising 0.005 to about 0.5 weight percent of a pour point depressant.

92. The wellbore fluid of claim 1 further comprising 0.01 to about 0.4 weight percent of a pour point depressant.

93. The wellbore fluid of claim 1 further comprising 0.02 to about 0.3 weight percent of a pour point depressant.

94. The wellbore fluid of claim 1 wherein the wellbore fluid is a drilling fluid comprising a base oil, at least one additive selected from the group consisting of emulsifiers, wetting agents, viscosifiers, weighting agents, and fluid loss control agents, and the white mineral oil constitutes at least about 50 weight percent of the base oil.

95. The wellbore fluid of claim 1 wherein the wellbore fluid is a drilling fluid comprising a base oil, at least one additive selected from the group consisting of emulsifiers, wetting agents, viscosifiers, weighting agents, and fluid loss control agents, and the white mineral oil constitutes at least about 75 weight percent of the base oil.

96. The wellbore fluid of claim 1 wherein the wellbore fluid is a drilling fluid comprising a base oil, at least one additive selected from the group consisting of emulsifiers, wetting agents, viscosifiers, weighting agents, and fluid loss control agents, and the white mineral oil constitutes at least about 90 weight percent of the base oil.

97. The wellbore fluid of claim 1 wherein the wellbore fluid is a drilling fluid comprising a base oil, at least one additive selected from the group consisting of emulsifiers, wetting agents, viscosifiers, weighting agents, and fluid loss control agents, and the white mineral oil constitutes at least about 95 weight percent of the base oil.

98. The wellbore fluid of claim 1 wherein the wellbore fluid is a drilling fluid comprising a base oil, at least one additive selected from the group consisting of emulsifiers, wetting agents, viscosifiers, weighting agents, and fluid loss control agents, and the white mineral oil constitutes at least about 96 weight percent of the base oil.

99. The wellbore fluid of claim 1 wherein the wellbore fluid is a drilling fluid comprising a base oil, at least one additive selected from the group consisting of emulsifiers, wetting agents, viscosifiers, weighting agents, and fluid loss control agents, and the white mineral oil constitutes at least about 97 weight percent of the base oil.

100. The wellbore fluid of claim 1 wherein the wellbore fluid is a drilling fluid comprising a base oil, at least one additive selected from the group consisting of emulsifiers, wetting agents, viscosifiers, weighting agents, and fluid loss control agents, and the white mineral oil constitutes at least about 98 weight percent of the base oil.

* * * * *